(12) United States Patent
Kaku

(10) Patent No.: US 7,567,275 B2
(45) Date of Patent: Jul. 28, 2009

(54) IMAGE RECORDER

(75) Inventor: Junya Kaku, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 674 days.

(21) Appl. No.: 10/482,653

(22) PCT Filed: May 23, 2002

(86) PCT No.: PCT/JP02/05029

§ 371 (c)(1),
(2), (4) Date: Jan. 5, 2004

(87) PCT Pub. No.: WO03/005715

PCT Pub. Date: Jan. 16, 2003

(65) Prior Publication Data

US 2004/0196388 A1    Oct. 7, 2004

(30) Foreign Application Priority Data

Jul. 4, 2001    (JP) .............................. 2001-202893

(51) Int. Cl.
H04N 5/76    (2006.01)
H04N 5/228   (2006.01)
G06K 9/60    (2006.01)

(52) U.S. Cl. .............. 348/231.2; 348/231.6; 348/231.9; 348/231.3; 348/222.1; 382/305

(58) Field of Classification Search .............. 348/231.2, 348/372, 231.7, 231.3, 231.6, 231.9, 222.1; 395/615; 382/305, 282, 403
See application file for complete search history.

(56) References Cited

U.S. PATENT DOCUMENTS 5,477,264 A * 12/1995 Sarbadhikari et al. ..... 348/231.6
5,724,579 A *  3/1998 Suzuki ...................... 707/104.1
6,104,840 A *  8/2000 Ejiri et al. .................. 382/284

(Continued)

FOREIGN PATENT DOCUMENTS

JP    6-90423    3/1994

(Continued)

OTHER PUBLICATIONS

Front cover of Japanese Application No. 3643793 in which Cite Nos. 1-3 were disclosed.

Primary Examiner—David L Ometz
Assistant Examiner—Peter Chon
(74) Attorney, Agent, or Firm—Westerman, Hattori, Daniels & Adrian, LLP.

(57) ABSTRACT

A digital camera (10) includes an SDRAM (26). When 40 frames of image signals are accumulated in the SDRAM (26), a combined file including the 40 frames of image signals is created in a data area of a magnetooptical disk (36), and FAT information of the combined file is written into an FAT area of the magnetooptical disk (36). When a predetermined condition is satisfied, image data of the combined file is read out by each 1 frame, and an image file including the read image data is created in the data area of the magnetooptical disk (36), and the FAT information of the image file is written into the FAT area of the magnetooptical disk (36). Such the process is repeated for 40 times, and the combined file is later deleted.

8 Claims, 12 Drawing Sheets

U.S. PATENT DOCUMENTS 6,466,701 B1 * 10/2002 Ejiri et al. .................... 382/284
6,744,465 B1 * 6/2004 Tomikawa ................ 348/231.2
6,978,051 B2 * 12/2005 Edwards ..................... 382/284

FOREIGN PATENT DOCUMENTS

| JP | 6-105273 | 4/1994 |
|----|----------|--------|
| JP | 7-236110 | 9/1995 |
| JP | 07-319751 | 12/1995 |
| JP | 11-120043 | 4/1999 |
| JP | 11-308560 | 11/1999 |
| JP | 2000-236467 | 8/2000 |
| JP | 2001-101056 | 4/2001 |
| JP | 2001-111955 | 4/2001 |

* cited by examiner

38a

| LIST NO. | COMMAND | PARAMETER 1 | PARAMETER 2 | PARAMETER 3 |
|---|---|---|---|---|
| 0 | | | | |
| 1 | | | | |
| 2 | | | | |
| 3 | | | | |
| ⋮ | ⋮ | ⋮ | ⋮ | ⋮ |

(A) COMBINED FILE (B) IMAGE FILE

IMAGE RECORDER

TECHNICAL FIELD

The present invention relates to an image recording apparatus. More specifically, the present invention relates to an image recording apparatus adapted to a digital camera, and recording an image signal into a recording medium via a buffer memory.

PRIOR ART

In a digital camera, if a successive-photographing mode (successive-shooting mode) is selected, an object is photographed at a ratio of once in every 1/15 seconds, for example, and photographed image signals are stored in a buffer memory. Upon completion of a predetermined number of times of the photographing, a recording process of a plurality of the image signals accumulated in the buffer memory is performed. More specifically, a plurality of image files respectively including a plurality of the image signals are formed in a data area of a recording medium, and file managing information respectively managing a plurality of the image files are written into a managing area of the recording medium.

However, a writing of a new image signal into the buffer memory is prohibited during a time that the recording process is performed. If the recording medium is a disk recording medium such as a magnetooptical disk, there is a case that the recording process of one image signal takes approximately two seconds. As a consequence, if the number of successive photographings is 40, it takes approximately 80 seconds from a time that 40 image signals are stored in the buffer memory until a next photographing is made possible.

It is noted that out of the recording processes, it is a creating process of the file managing information that takes the longest time. This results from a fact that the data area and a file managing area are separately formed, and therefore, it needs a head seek from the data area to the file managing area.

SUMMARY OF THE INVENTION

Therefore, it is a primary object of the present invention to provide a novel image recording apparatus.

It is another object of the present invention to provide an image recording apparatus capable of rapidly releasing a buffer memory.

An image recording apparatus according to the present invention comprises: a first-file creating means for creating in a data area of a recording medium a first file including an M (M≧2) of image signals stored in a buffer memory; a first-managing-information creating means for creating first managing information that manages the first file; a reading-out means for reading out by each N (N<M) of the image signals from the first file based on the first managing information when a predetermined condition is satisfied; a second-file creating means for creating in the data area a second file including the N of the image signals read out by the reading-out means; and a second-managing-information creating means for creating in a managing area of the recording medium a second-file managing information that manages the second file.

First, a first file including an M (M≧2) of image signals stored in a buffer memory is created in a data area of a recording medium by a first-file creating means, and first managing information that manages the first file is created by a first-managing-information creating means. A reading-out means reads out by each N (N<M) of the image signals from the first file based on the first managing information when a predetermined condition is satisfied. A second file including the read N of the image signals is created in the data area of the recording medium by a second-file creating means, and second-file managing information that manages the second file is created in a managing area of the recording medium by a second-file managing information creating means.

The number of the image signals included in the first file is larger than that of the image signals included in the second file. In other words, the number of the first files is less than that of the second files. On the other hand, regarding a time required for creating the managing information, the larger the number of the files, the longer the time takes. Consequently, it is understood that a time for creating the first file in the data area and creating the first managing information is shorter than the time for creating the second file in the data area and creating the second managing information in the managing area, and therefore, it is possible to rapidly release the buffer memory.

In a case that the recording medium is detachable, it is desirable that the first-file managing information creating means creates in the managing area of the recording medium the first file managing information. Thereby, even when a recording toward the recording medium is performed in another apparatus, and then, the recording medium is attached to the image recording apparatus of the present invention, it is possible to appropriately create the second file.

In a case that the second-file managing information is created at every time that the second file is created once, if it is determined whether or not a predetermined condition is satisfied at every time that the second-file managing information is created once, it becomes possible to suspend/resume creating the second file. Thereby, flexibility is improved.

In a case of fetching the image signal into the buffer memory when receiving a fetching instruction of the image signal, if a condition not receiving the fetching instruction is included in the predetermined condition, responsiveness toward the fetching instruction is improved.

If the M of image signals are to be fetched in response to the fetching instruction, it is possible to contain the fetched image signals into one first image file, and thereby, it becomes easy to handle the image signal.

In a case of using the disk recording medium formed as a result of the data area and the managing being divided radially, the recording is performed by a movable recording member moving between the data area and the managing area. In such the case, a time required for creating the second file and the second managing information is further longer, and the advantages of the present invention becomes more obvious.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
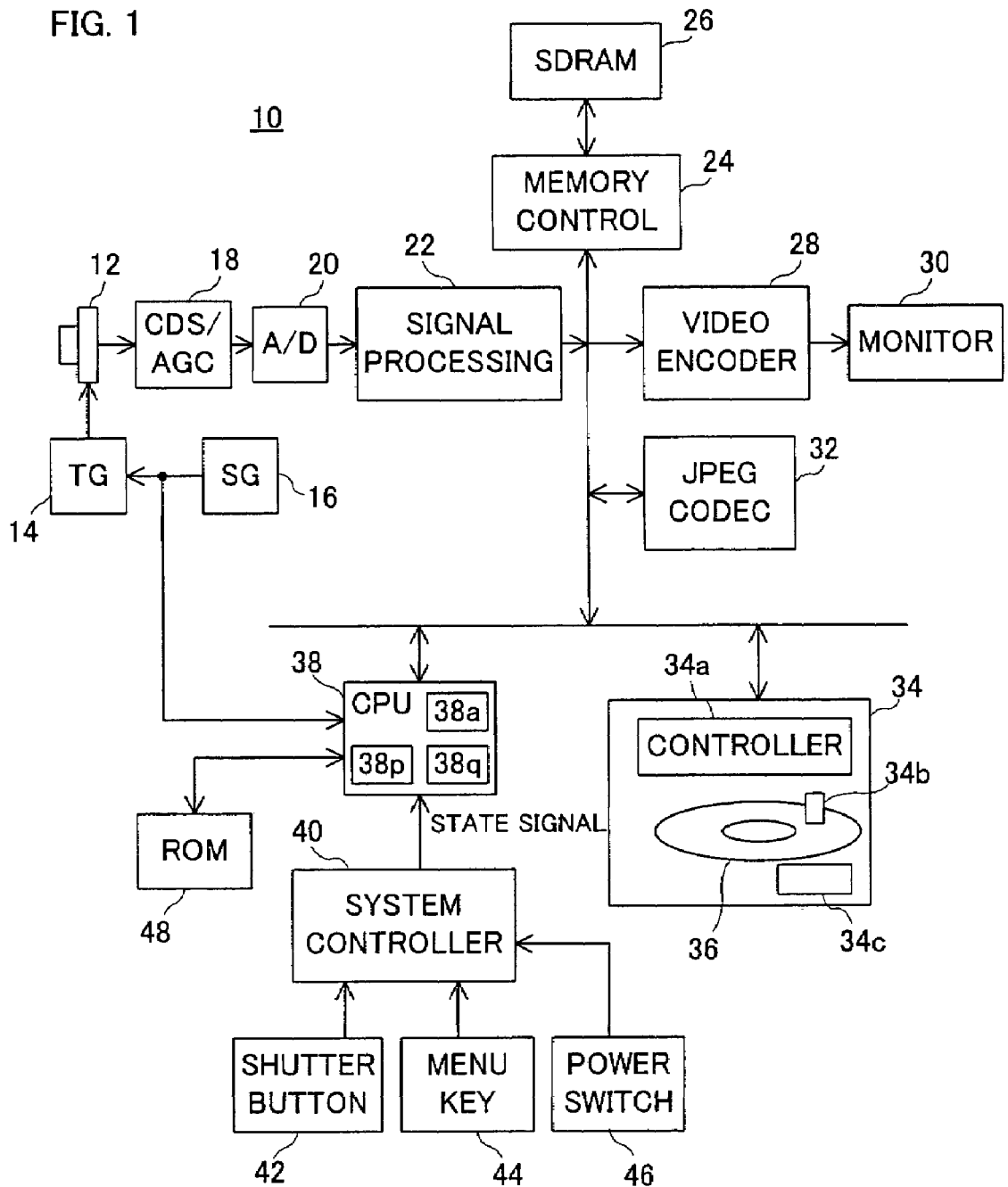
FIG. 1 is block diagram showing one embodiment of the present invention.

Referring to FIG. 1, a digital camera 10 of this embodiment includes an image sensor 12. A color filter (not shown) is attached at a front surface of the image sensor 12, and an optical image of an object is incident on the image sensor 12 via this color filter.

When a power switch 46 is turned on, a system controller 40 supplies a battery power (not shown) to the whole system, and applies a corresponding state signal to a CPU 38. The CPU 38 instructs a TG (Timing Generator) 14 to perform a photographing in accordance with a frame rate at 15 fps, for example, and applies a predetermined process instruction to a signal processing circuit 22 and a video encoder 28.

The TG 14 generates a timing signal based on a vertical synchronizing signal and a horizontal synchronizing signal output from an SG (Signal Generator) 16, and drives the image sensor 12 according to a luster scanning system. A camera signal (electric charge) is output from the image sensor 12 at a ratio of 1 frame per 1/15 seconds. The output camera signal is input into the signal processing circuit 22 as camera data, which is a digital signal, via a CDS/AGC circuit 18 and an A/D converter 20.

The signal processing circuit 22 applies to the input camera data processes such as a color separation, a white balance adjustment, a YUV conversion, and etc., so as to generate YUV data (display image data), and applies the generated display image data to a memory control circuit 24. The display image data is written into a display image data area 26 a shown in FIG. 2 by the memory control circuit 24.

The video encoder 28 reads out the display image data from the display image data area 26 a through the memory control circuit 24, and encodes the read display image data into a composite image signal. The encoded composite image signal is applied to a monitor 30, and as a result, a real time moving image (through image) of the object is displayed on the monitor 30.

If a shutter button 42 is operated at a start that a successive photographing mode (successive shooting mode) is selected by a menu key 44, a state signal showing that a successive-photographing operation is performed is applied from the system controller 40 to the CPU 38. The CPU 38, after adjusting photographing conditions such as an exposure amount, a white balance, and etc., instructs the TG 14 to perform an exposure 40 times, for example. The TG 14 performs the exposure a total of 40 times at a ratio of once every 1/15 seconds, and reads out from the image sensor 12 the camera signal obtained as a result of each exposure. The read camera signal of each frame is converted into the display image data as in the above, and the converted display image data is stored into the display image data area 26a of the SDRAM 26 by the memory control circuit 24.

The CPU 38 applies a compression instruction to a JPEG CODEC 32 at every time that 1 frame of the camera signal is read out. The JPEG CODEC 32 reads out the display image data from the displayed image area 26a through the memory control circuit 24, and applies a JPEG compression to the read display image data. The compressed image data thus created, that is, JPEG data, is written into a JPEG data area 26b of the SDRAM 26 by the memory control circuit 24.

Furthermore, the CPU 38 creates by itself additional data at every time that 1 frame of the JPEG compression is performed. File path information used for a file dividing process described later, and photographing condition information used as header data of divided image files are included in the additional data. The created additional data is applied to the SDRAM 26 through the memory control circuit 24, and written into an additional data area shown in FIG. 2. It is noted that a shutter speed and an aperture amount at a time of photographing, a resolution of the photographed image, a Q factor associated with the compression rate of the JPEG compression, a JPEG data size, and etc., are included in the photographed condition information.

Figure 2:
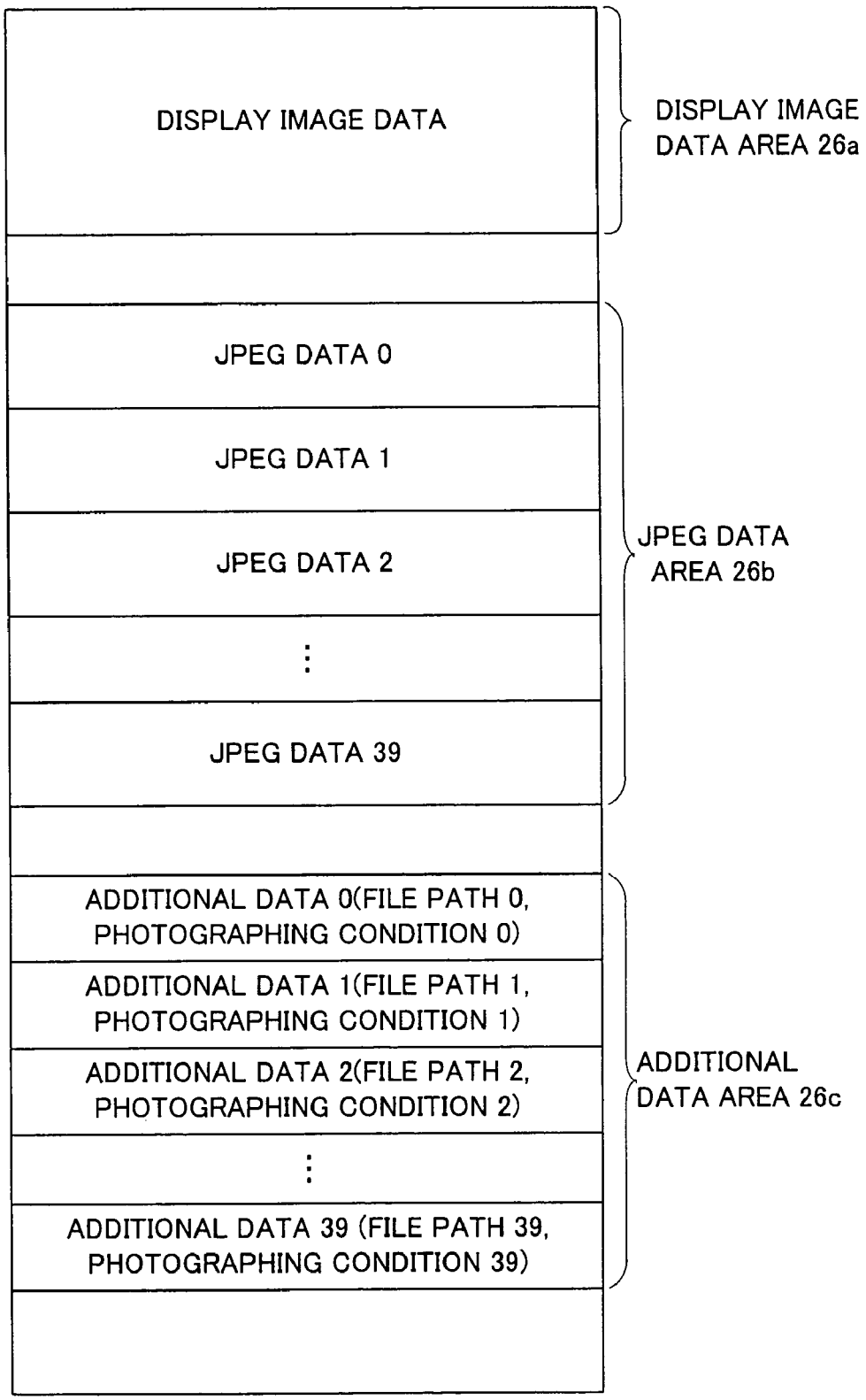
FIG. 2 is a block diagram showing one example of a mapping state of an SDRAM.

By the time that the 40 times of the exposure processes, the 40 times of the compression processes, and 40 times of the additional data creating processes are completed, the JPEG data 0-39 and the additional data 0-39 are stored in the SDRAM 26 as shown in FIG. 2. It is noted that a process, which is from starting the exposure of the image sensor 12 in response to the successive-photographing operation until securing the 40 frames of the JPEG data and the additional data into the SDRAM 26, is defined as a successive-photographing process.

Figures 3, 4:
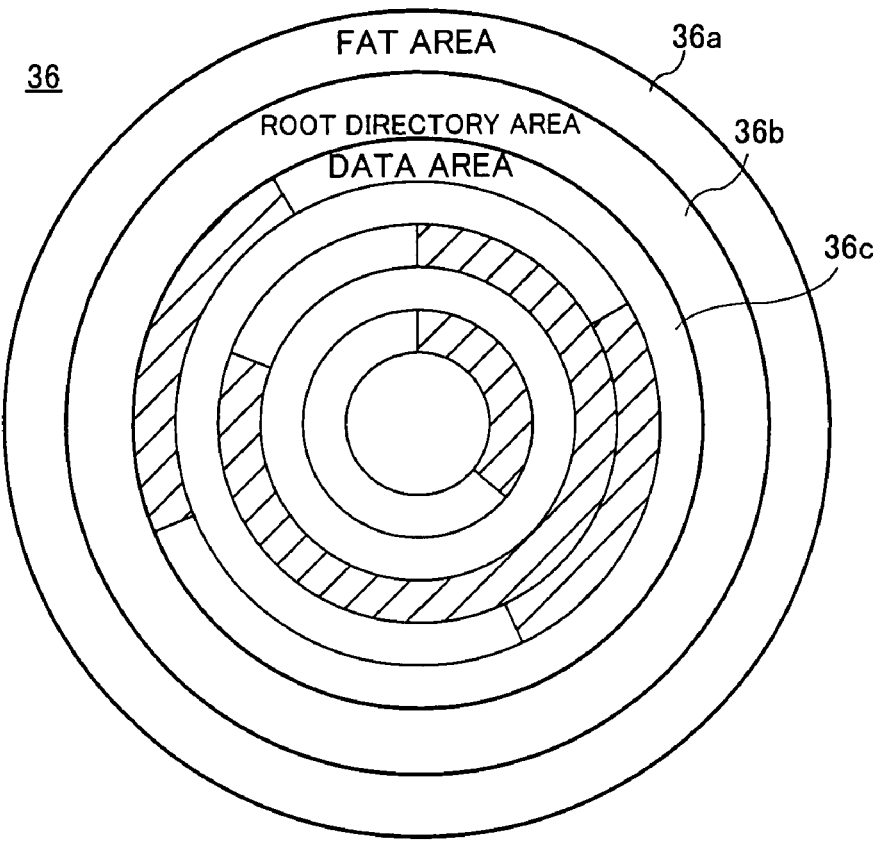
FIG. 3 is an illustrative view showing one example of structure of a recording surface of a magnetooptical disk.
FIG. 4 is an illustrative view showing one example of an instruction list.

The CPU 38 is equipped with a real-time OS such as μ iTRON, and a combined-file recording process, in which the combined file including the JPEG data 0-39 and the additional data 0-39 is recorded into the magnetooptical disk 36, is performed in parallel with the successive-photographing process. The magnetooptical disk 36 is a detachable non-volatile disk recording medium, and an FAT (File Allocation Table) area 36a, a root directory area 36b, and a data area 36c are formed on a recording surface as shown in FIG. 3. A plurality of vacant clusters (cluster: unit recording area) are sporadically distributed in the data area 36c, and FAT information showing a link state of written clusters, that is, the clusters in which the data is already written, is written into the FAT area 36a. Furthermore, a directory entry is written into the root directory area 36b.

The CPU 38 outputs a predetermined access request onto a disk drive 34 in the combined-file recording process. The disk controller 34a controls a magnetic head 34b and an optical pick up 34c so as to access the magnetooptical disk 36 in a manner corresponding to the access request. Herein, the CPU 38 uses an instruction list 38a as shown in FIG. 4 so that processes are smoothly performed between the successive-photographing process and the combined-file recording process.

When the shutter button 42 is depressed, the CPU 38 sets to the instruction list 38a commands and parameters respectively corresponding to "start recording process", "create folder", "create file", and "open file". As a result of "start recording process" being executed, the combined-file recording process is started, and as a result of "create folder" being executed, a successive-shooting folder is newly created in the data area 36c shown in FIG. 3. Furthermore, as a result of "create file" being executed, a combined file is created at a lower hierarchy of the new successive-shooting folder, and as a result of "open file" being executed, a handle number for specifying the new combined file is created.

In addition, at every time that 1 frame of the JPEG data is stored in the SDRAM 26, "write file" for the additional data, and "write file" for the JPEG data are set to the instruction list 38a. Both "write file" instructions have the handle number of the combined file as the parameter, and the additional data and the JPEG data are stored in the combined file. Both the JPEG data and the additional data exist worth 40 frames, a total of 80 "write file" instructions are set to the instruction list 38a. When all the "write file" instructions have been executed, the combined file as shown in FIG. 6(A) is obtained.

Upon completion of creating the combined file, "close file" and "end record process" are set to the instruction list 38a. As a result of "close file" being executed, the FAT information written in the FAT area 36a and size information written in the root directory area 36b are updated. That is, the FAT information is updated in such a manner that a link is formed in the writing area (cluster) of the combined file created this time, and the size information of a sub directory to which the combined file belongs is updated. The combined-file recording process is ended by executing "end recording process".

Figure 5:
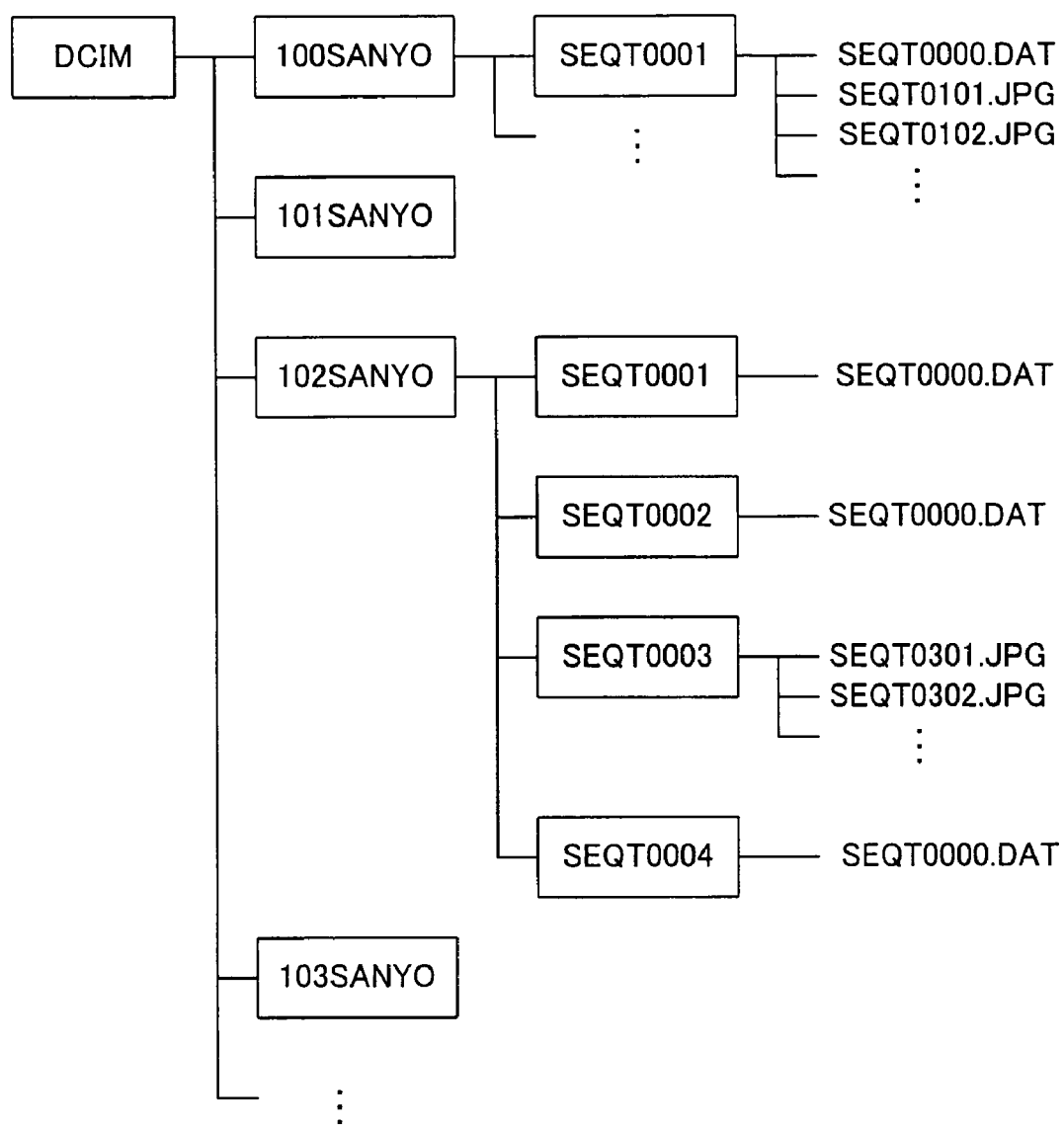
FIG. 5 is an illustrative view showing one example of hierarchical structure of a directory.

The data area 36c of the magnetooptical disk 36 has directory structure as shown in FIG. 5. A plurality of sub directories "*SANYO" (*: a three-digit directory number starting from 100) are formed at a lower hierarchy of a root directory "DCIM", and the successive-shooting folder "SEQ XXXX" (XXXX: a four-digit folder number starting from 0001) is formed at a lower hierarchy of an arbitrary sub directory. The successive-shooting folder is newly created at a lower hierarchy of the sub directory currently selected, and the combined file is created at a lower hierarchy of the successive-shooting folder. The folder number subsequent to the folder number of the latest successive-shooting folder belonging to the same sub directory is allotted to the newly created successive-shooting folder. On the other hand, a file name of the combined file is always "SEQT0000.DAT".

Therefore, if the sub directory selected when the successive photographing is performed is "102SANYO", and the latest successive-shooting folder existing at a lower hierarchy of the sub directory is "SEQ0003", the successive-shooting folder "SEQ0004" is newly created in response to the successive-photographing operation, and the combined file "SEQT0000.DAT" is created at a lower hierarchy of the successive-shooting folder.

According to FIG. 5, the combined file "SEQT0000.DAT" is stored in the successive-shooting folders "SEQ0001" and "SEQ0002" created at a lower hierarchy of the sub directory "102SANYO", and a plurality of the image files "SEQ0301.JPG", "SEQ0302.JPG", and . . . are stored in the successive-shooting folder "SEQ0003" created at a lower hierarchy of the sub directory "102SANYO". This means that while the dividing process of the combined file stored in the successive-shooting folder "SEQ0003" is completed, the dividing process of the combined files stored in the successive-shooting folders "SEQ0001" and "SEQ0002" is not completed. Furthermore, the combined file "SEQ0000.DAT" and a plurality of the image files "SEQ0101.JPG", "SEQ0102.JPG", and . . . are stored in the successive-shooting folder "SEQ0001" created at a lower hierarchy of the sub directory "101SANYO", and this means that selecting of another sub directory and the successive-photographing operation is performed during the file dividing process, and therefore, the file dividing process is not completed.

The file dividing process is performed by the CPU 38 when the JPEG data based on the successive photographing does not exist in the SDRAM 26 and the successive-photographing operation is not performed. At this time, the instruction list 38a is not used. First, the latest successive-shooting folder is detected from the currently selected sub directory, and the combined file stored in the detected successive-shooting folder is opened. Next, the file path information is read from the opened combined file, and a new image file is created based on the read file path information. A creating destination of the image file exists at the same hierarchy as the combined file from which the file path information is read out.

When the new image file is created, the photographing condition information and the JPEG data regarding the file path information are read out from the combined file. Subsequently, the JPEG header including the read photographing condition information and the read JPEG data are stored in the new image file. Upon completion of a storing process of the JPEG data, the new image file is closed. That is, the FAT information of the FAT area 36a is updated in such a manner that a link is formed among the clusters in which the new image file is written, and the size information (size information in the root directory area 36b) of the sub directory to which the new image file belongs is updated. Such the creating/closing process of the new image file is repeated 40 times regarding the combined file to be noticed, and this allows to obtain 40 image files shown in FIG. 6 (B). The combined file to which the file dividing process is applied is deleted, later. Concurrent with the deletion, the size information of the sub directory written in the root directory area 36b is updated.

It is noted that it is determined whether or not the successive-photographing operation is performed at every time that the new image file is closed, and if the successive-photographing operation is performed, the file dividing process is suspended. The suspended file dividing process is resumed after the combined file based on the successive-photographing operation is created.

The FAT area 36a, the root directory area 36b, and the data area 36c are formed in a divided manner in a radius direction of the magnetooptical disk 36. In order to update the FAT information and the size information, it is necessary the magnetooptical head 34b and the optical pick up 34c are moved from the data area 36c to the FAT area 36a, and in addition, the magnetooptical disk 34b and the optical disk 34c are moved from the FAT area 36a to the root directory area 36b. In this embodiment, when the successive-photographing operation is performed, first, the combined file is created in the data area 36c of the magnetooptical disk 36, and the FAT information of the FAT area 36a and the size information of the root directory area 36b are updated only once. This makes it possible to rapidly release the JPEG data area 26b and the additional data area 26c of the SDRAM 26, and improve responsiveness of the successive-photographing operation.

Figure 7:
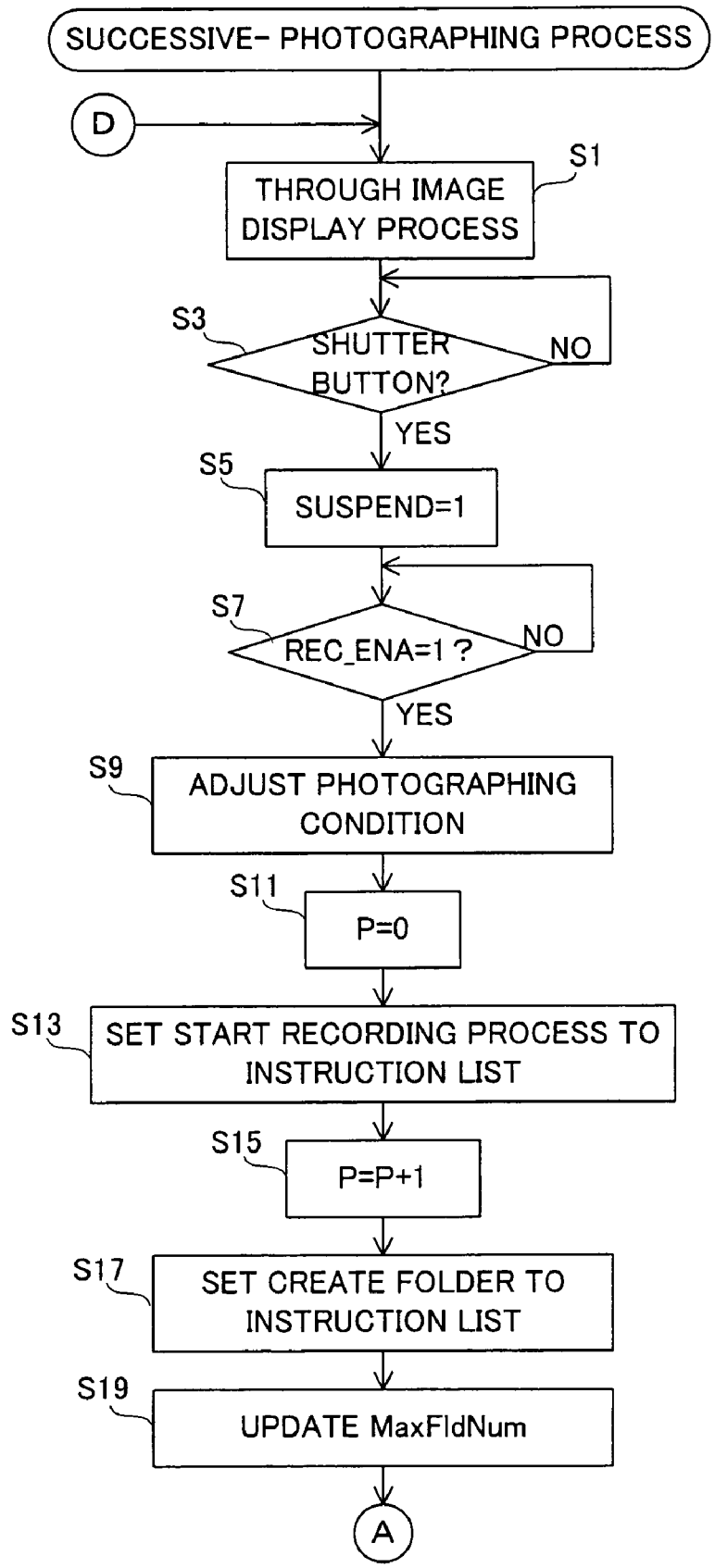
FIG. 7 is a flowchart showing one portion of an operation of a CPU when performing a successive-photographing process.
Figure 8:
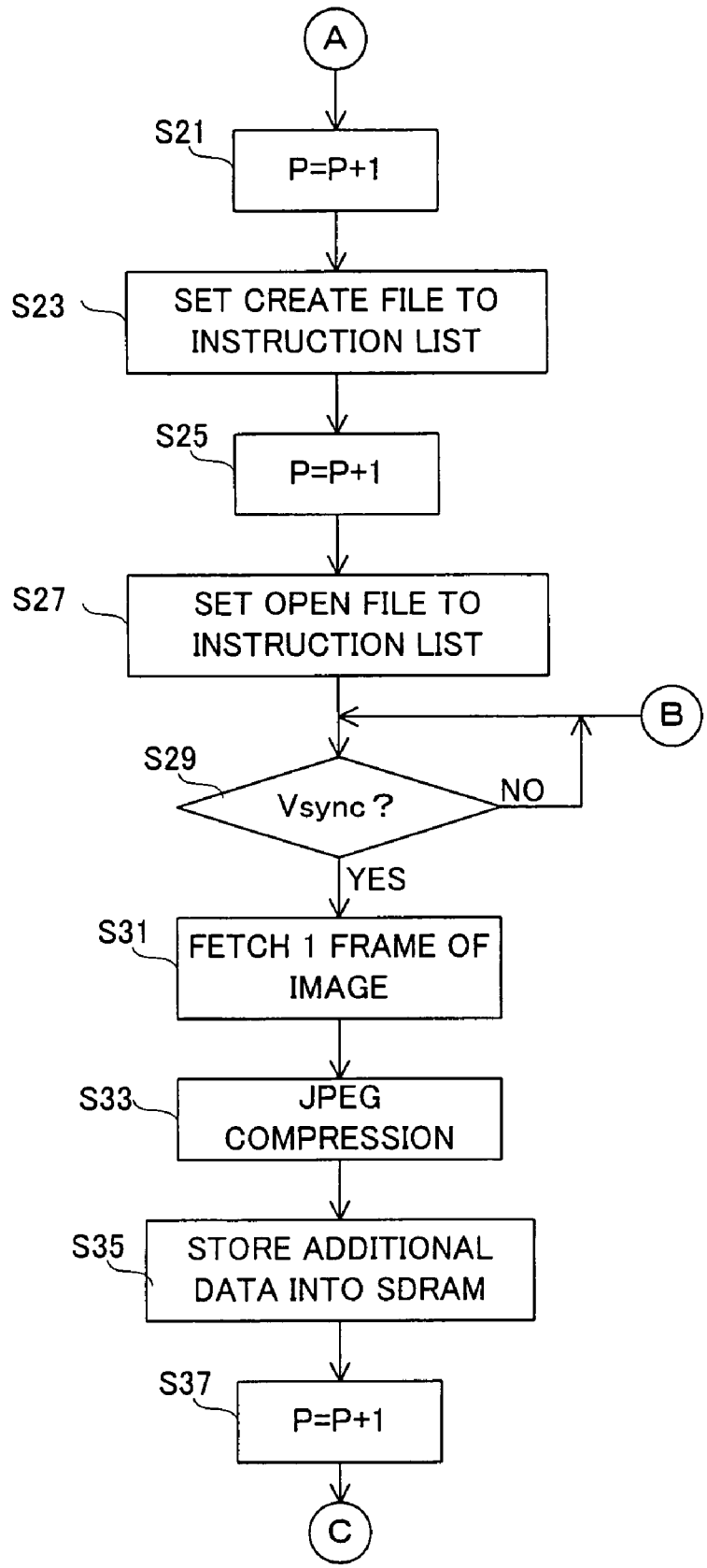
FIG. 8 is a flowchart showing another portion of the operation of the CPU when performing the successive-photographing process.
Figure 9:
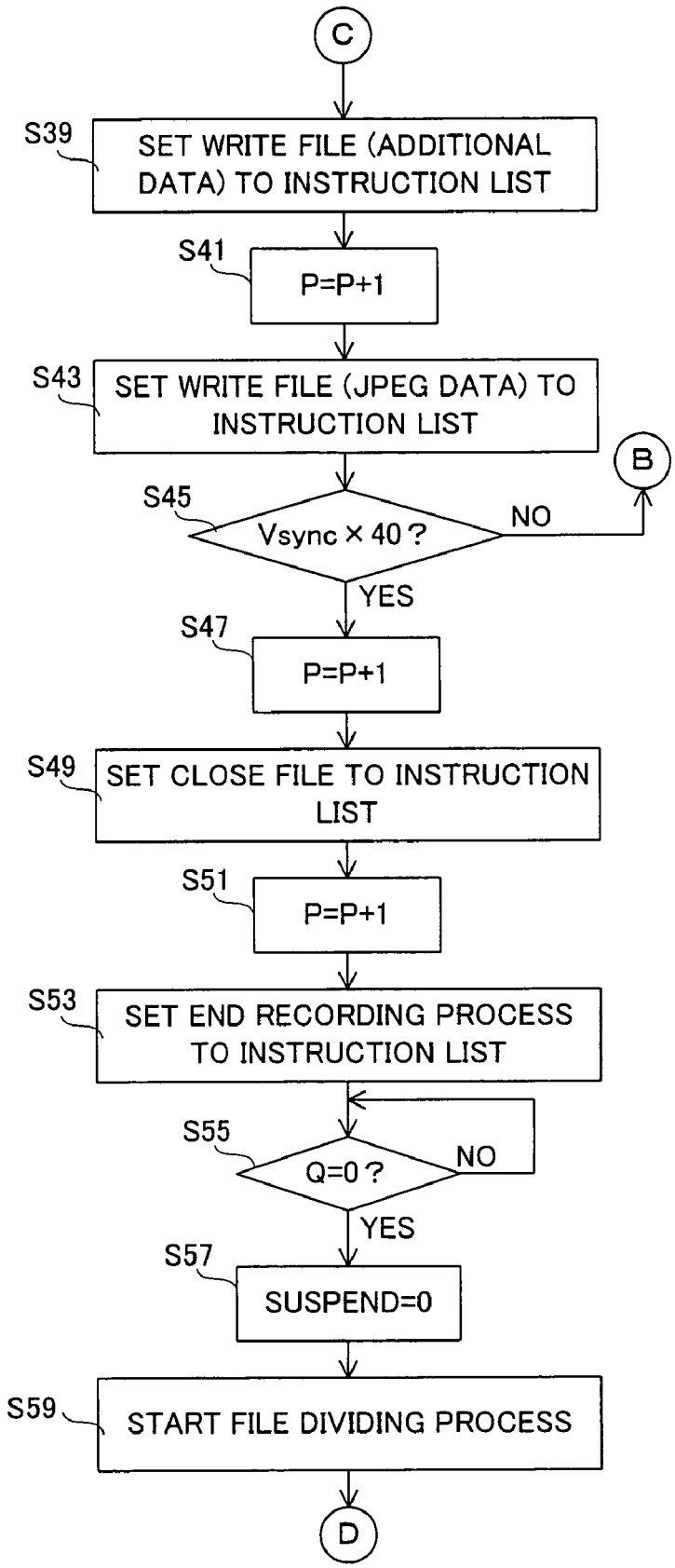
FIG. 9 is a flowchart showing the other portion of the operation of the CPU when performing the successive-photographing process.
Figure 12:
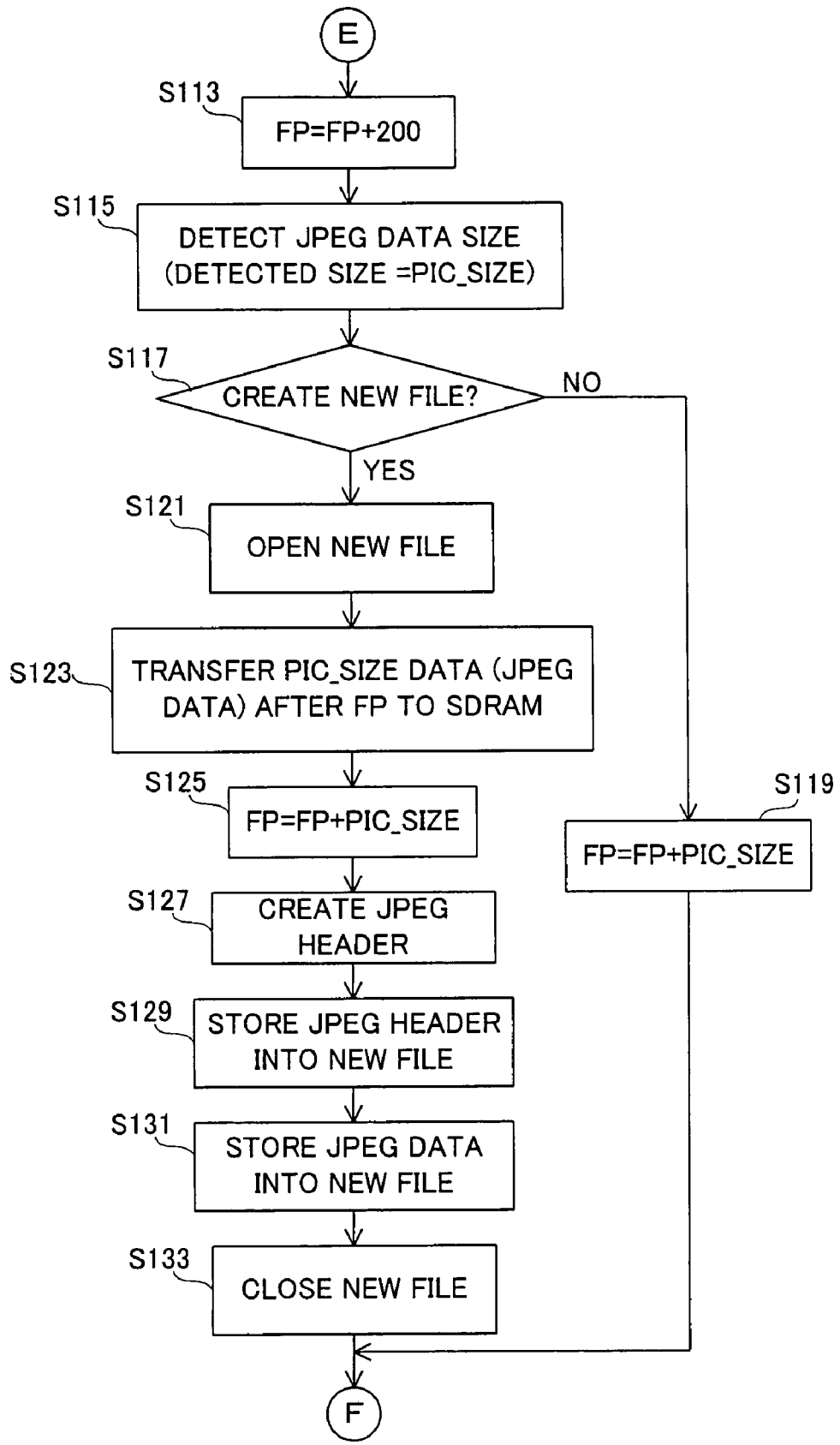
FIG. 12 is a flowchart showing another portion of the operation of the CPU when performing the file dividing process.
Figure 13:
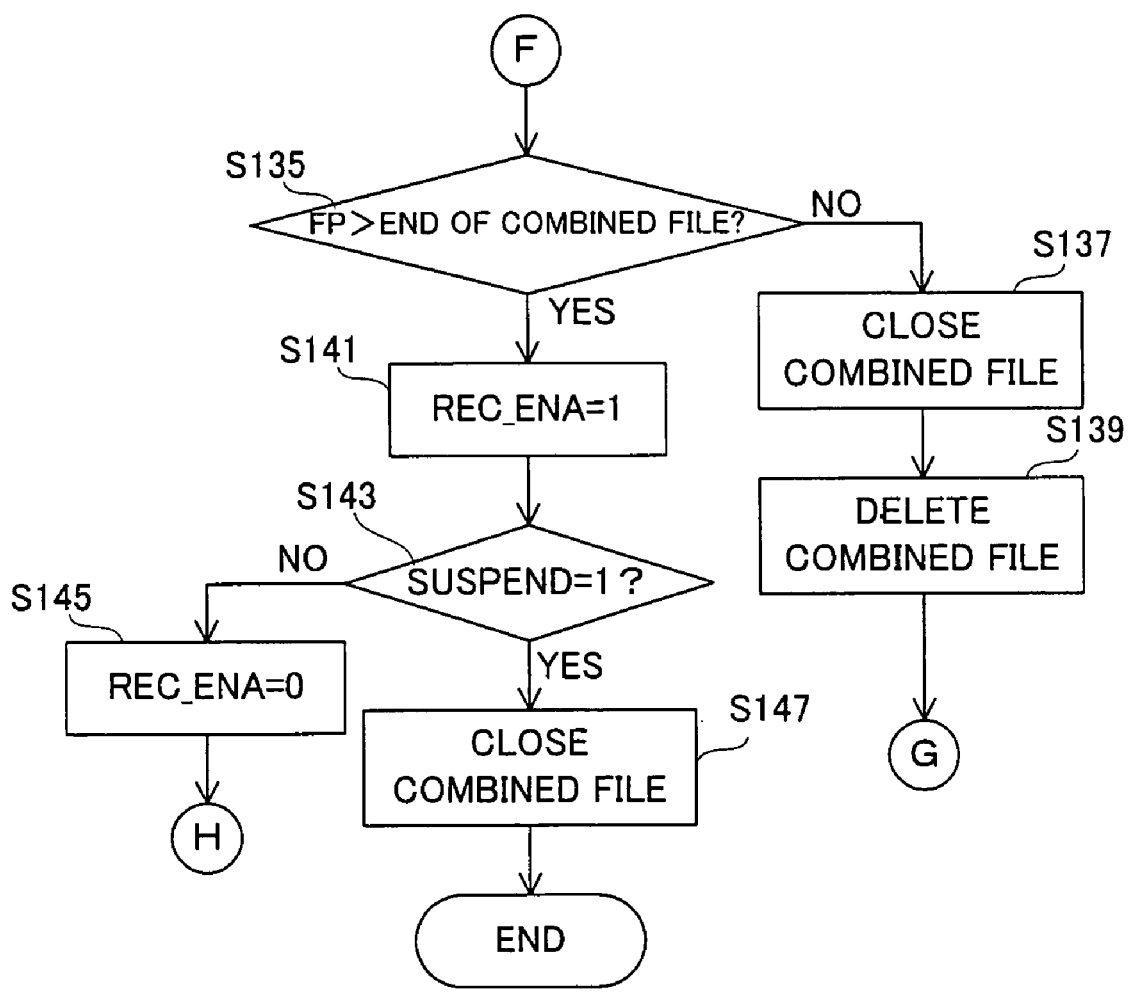
FIG. 13 is a flowchart showing the other portion of the operation of the CPU when performing the file dividing process.

When the successive photographing is performed, a control program corresponding to flow charts shown in FIG. 7-FIG. 9, that is, steps S1-S59, is executed by the CPU 38. When the combined file is recorded, a control program corresponding to a flow chart shown in FIG. 10, that is, steps S61-S85, is executed by the CPU 38, and when the combined file is divided, a control program corresponding to flow charts shown in FIG. 11-FIG. 13, that is, steps S91-S147, is executed by the CPU 38. It is noted that these control programs are stored in a ROM 48.

First, referring to FIG. 7, a through image displaying process is performed in the step S1. More specifically, a photographing instruction is applied to the TG 14, and a processing instruction is applied to the signal processing circuit 22 and the video encoder 28. Thereby, a through image is displayed on the monitor 30. In the step S3, it is determined whether or not the shutter bottom 42 is operated, and if YES, a flag SUSPEND is set in the step S5. In the step S7, a state of a flag REC_ENA is determined, and if a set state is determined, the process advances to the step S9.

The set state of the flag SUSPEND is a state for requesting suspending the file dividing process, and a reset state is a state for allowing to continue the file dividing process. The set/reset of the flag SUSPEND is changeable by the successive-photographing operation. The set state of the flag REC_ENA is a state for allowing the successive-photographing operation, and the reset state is a state for prohibiting the successive-photographing operation. The set/reset of the flag REC_ENA is changeable by the file dividing process.

In the step S9, photographing conditions such as the shutter speed, the aperture amount, the white balance, and etc., are adjusted. In the step S11, a count value P of a counter 38p is reset, and in the subsequent step S13, "start recording process" is set to the instruction list 38a. In the step S15, the count value P is incremented, and in the step S17, "create folder" is set to the instruction list 38a. In the step S19, the folder number of the successive-shooting folder newly created by "create folder" is set as a maximum folder number MaxFldnum. In the step S21, the count value P is incremented, and in the step S23, "create folder" is set to the instruction list 38a. In the step S25, the count value P is incremented, and in the step S27, "open file" is set to the instruction list 38a.

The count value P corresponds to the list number of the instruction list 38a shown in FIG. 4. Therefore, "start recording process", "create folder", "create file", and "open file" are separately set to columns of the list numbers "0"-"4".

TABLE 1

| Kind | Command | Parameter 1 | Parameter 2 | Parameter 3 |
| --- | --- | --- | --- | --- |
| start recording process | FILE_STRT | . . . | . . . | . . . |
| create folder | FOLDER_CREATE | drive number | file path | . . . |
| create file | FILE_CREATE | drive number | file path | . . . |
| open file | FILE_OPEN | drive number | file path | . . . |
| write file | FILE_WRITE | handle number | SDRAM address | size (byte) |
| close file | FILE_CLOSE | handle number | . . . | . . . |
| end recording process | FILE_END | . . . | . . . | . . . |

Referring to Table 1, regarding "start recording process", FILE_STRT is set as a command, and regarding "create folder", FOLDER_CREATE, the drive number, and the file path are set as a command, parameters 1, and 2. Furthermore, regarding "create file", FILE_CREATE, the drive number, and the file path are set as the command, and the parameters 1, and 2, and regarding "open file", FILE_OPEN, the drive number, and the file path are set as the command, the parameters 1, and 2.

In a case that the sub directory currently selected is "102SANYO", and the latest successive-shooting folder formed in the sub directory is "SEQT0003", the file path being set in relation to "create file" is "¥¥DCIM¥¥102SANYO¥¥SEQT0004". Thereby, the successive-shooting folder "SEQT0004" is newly created at a lower hierarchy of the sub directory "102SANYO". In the subsequent "create file", "¥¥DCIM¥¥102SANYO¥¥SEQT0004¥¥SEQT0000.DAT" is set as the file path. Thereby, the combined file "SEQT0000.DAT" is created at a lower hierarchy of the successive-shooting folder "SEQT0004" newly created. Furthermore, in a case of opening the combined file, the file path being set in relation to "open file" is "¥¥DCIM¥¥102SANYO¥¥SEQT0004¥¥SEQT0000.DAT".

It is determined whether or not the vertical synchronizing signal is occurred in the step S29, and if YES, 1 frame of the display image data is fetched in the step S31. More specifically, the exposure instruction is applied to the TG 14, and the processing instruction is applied to the signal processing circuit 22. Thereby, the display image data is secured in the display image data area 26a of the SDRAM 26. In the step S33, a compression instruction is applied to the JPEG CODEC 32. The JPEG CODEC 32 reads out the display image data from the display image data area 26a, and applies a JPEG compression to the read display image data. The JPEG data generated by the JPEG compression is stored in the JPEG data area 26b of the SDRAM 26. In the step S35, the additional data including 72 bytes of the file path information and 200 bytes of the photographing condition information is created by the CPU 38, and the created additional data is written into the additional data area 26c of the SDRAM 24.

In a case that the combined file "SEQT0000.DAT" created in the step S109 exists in the successive-shooting folder "SEQT00004" at a lower hierarchy of the sub directory "102SANYO", the file path information created in the step S35 is "¥¥DCIM¥¥102SANYO¥¥SEQT0004¥¥SEQT++++.JPG" (++++: four-digit file number).

In the step S37, the count value P is incremented, and in the step S39, "write file" for the additional data is set to the instruction list 38a. In the step S41, the count value P is incremented, and in the step S43, "write file" for the JPEG data is set to the instruction list 38a. As understood from Table 1, regarding "write file", FILE_WRITE, the handle number (acquired by a file opening process described later), the SDRAM address, and the data size are set as the command, the parameters 1, 2, and 3. Therefore, in the step S39, a head address and the data size of the additional data stored in the SDRAM 26 in the immediately preceding step S35 are rendered the parameters 2, and 3, and in the step S43, the head address and the data size of the JPEG data stored in the SDRAM 26 based on the process in the immediately preceding step S33 are rendered the parameters 2, and 3.

In the step S45, it is determined whether or not the occurring number of the vertical synchronizing signals reaches 40 times, and if not reached 40 times, the process returns to the step S29. Therefore, a series of the processes of steps S31-S43 are repeated 40 times. The JPEG data 0-39 and the additional data 0-39 are stored in the SDRAM 26 as shown in FIG. 2, and a total of 80 "write file" instructions is set to the instruction list 38a.

If YES is determined in the step S45, the count value P is incremented in the step S47, and in the step S49, "close file" is set to the instruction list 38a. In the step S51, the count value P is incremented, and in the step S53, "end recording process" is set to the instruction list 38a. Regarding "close file", FILE_CLOSE is set as the command, and the handle number of the file to be closed is set as the parameter 1. Regarding "end recording process", FILE_END is set as the command.

In the step S55, a count value Q of the counter 38q is determined. In the combined-file recording process described later, the command of the list number corresponding to the count value Q is executed. The count value Q is incremented at every time that the command is executed once, and reset as a result of "end recording process" being executed. Therefore, Q equal to (=) 0 means that processes of all the commands are completed. In the step S55, YES is determined when Q is rendered 0 (Q=0), and in the step S57, the flag SUSPEND is reset. Thereafter, in the step S59, the file dividing process is activated, and the process returns to the step S1.

Figure 10:
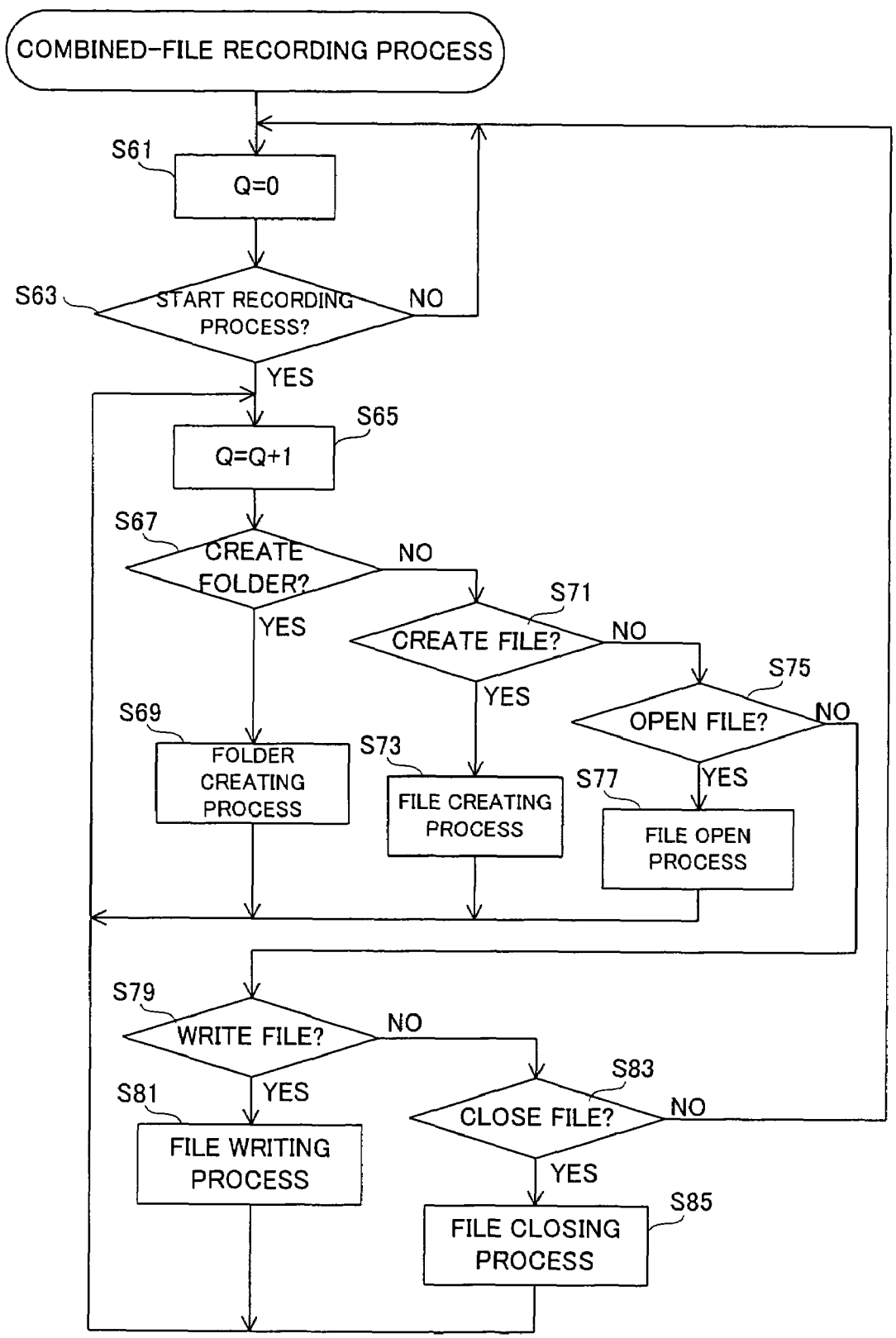
FIG. 10 is a flowchart showing an operation of a CPU when performing a combined-file recording process.

Referring to FIG. 10, in the combined-file recording process, first, the count value Q is reset in the step S61, and it is determined whether or not FILE_STRT is set to the list number corresponding to the count value Q in the step S63. Herein, if NO, the process returns to the step S61. However, if YES, the count value Q is incremented in the step S65, and the command of the list number corresponding to the count value Q after increment is determined in the steps S67, S71, S75, S79, and S83, respectively.

If the set command is FOLDER_CREATE, YES is determined in the step S67, and the folder creating process is performed in the step S69. More specifically, the disk drive 34 is specified by the drive number set as the parameter 1, a successive-shooting folder creating request based on the file path set as the parameter 2 is applied to the disk drive 34. Thereby, the successive-shooting folder is created in the data area 36c of the magnetooptical disk 36. In the above example, the successive-shooting folder "SEQT0004" is created at a lower hierarchy of the sub directory "102SANYO". When a READY signal is returned from the disk drive 34, it is assumed that the creating the successive-shooting folder is completed, and then, the process returns to the step S65.

If the set command is FILE_CREATE, YES is determined in the step S71, and the file creating process is performed in the step S73. That is, the disk drive 34 is specified by the drive number set as the parameter 1, and the file creating request based on the file path set as the parameter 2 is applied to the disk drive 34. Thereby, the combined file is created in the data area 36c of the magnetooptical disk 36. In the above example, the combined file "SEQT0000.DAT" is created at a still lower hierarchy of the successive-shooting folder "SEQT0004" created at a lower hierarchy of the sub directory "102SANYO". When the READY signal is returned from the disk drive 34, it is assumed that the creating the combined file is completed, and the process returns to the step S65.

If the set command is FILE_OPEN, the process advances from the step S75 to the step S77, and thereby, the file opening process is performed. That is, the disk drive 34 is specified by the drive number set as the parameter 1, and the combined-file opening request based on the file path set as the parameter 2 is applied to the disk drive 34. When the READY signal indicating that the combined file is opened is returned from the disk drive 34, the handle number allotted to the combined file is created. In the above example, the combined folder "SEQT0000.DAT" stored in the successive-shooting folder "SEQT0004" at a lower hierarchy of the sub directory "102SANYO" is specified, and the handle number allotted to the combined file is created. The created handle number is used for "write file" in the steps S39 and S43 shown in FIG. 8. Upon completion of the process, the process returns to the step S65.

If the set command is FILE_Write, the process advances from the step S79 to the step S81, and thereby, the file write process is performed. More specifically, the combined file of writing destination is specified by the handle number set to the parameter 1, the data is read out from the SDRAM 26 based on the SDRAM address and the data size set to the parameters 2 and 3, and the disk drive 34 is requested to write the read data into the combined file specified by the handle number. The disk drive 34 creates the FAT information indicating a link state of the written clusters at every time that one cluster of the data writing is completed. The created FAT information is written into the SDRAM 26 by the CPU 38. Upon completion of the file writing process, the process returns to the step S65.

If the set command is FILE_CLOSE, the process advances from the step S83 to the step S85, and thereby, the file closing process is performed. More specifically, the FAT information of the FAT area 36a is updated by the FAT information stored in the SDRAM 26, and the size information of the root directory 36b is updated by an increased amount of the file size. Upon completion of the file closing process, the process returns to the step S65.

If the set command is FILE_END, NO is determined in the step S83, and the process returns to the step S61. Thereby, the count value Q is reset, and the combined-file recording process is moved to a waiting state.

Figure 11:
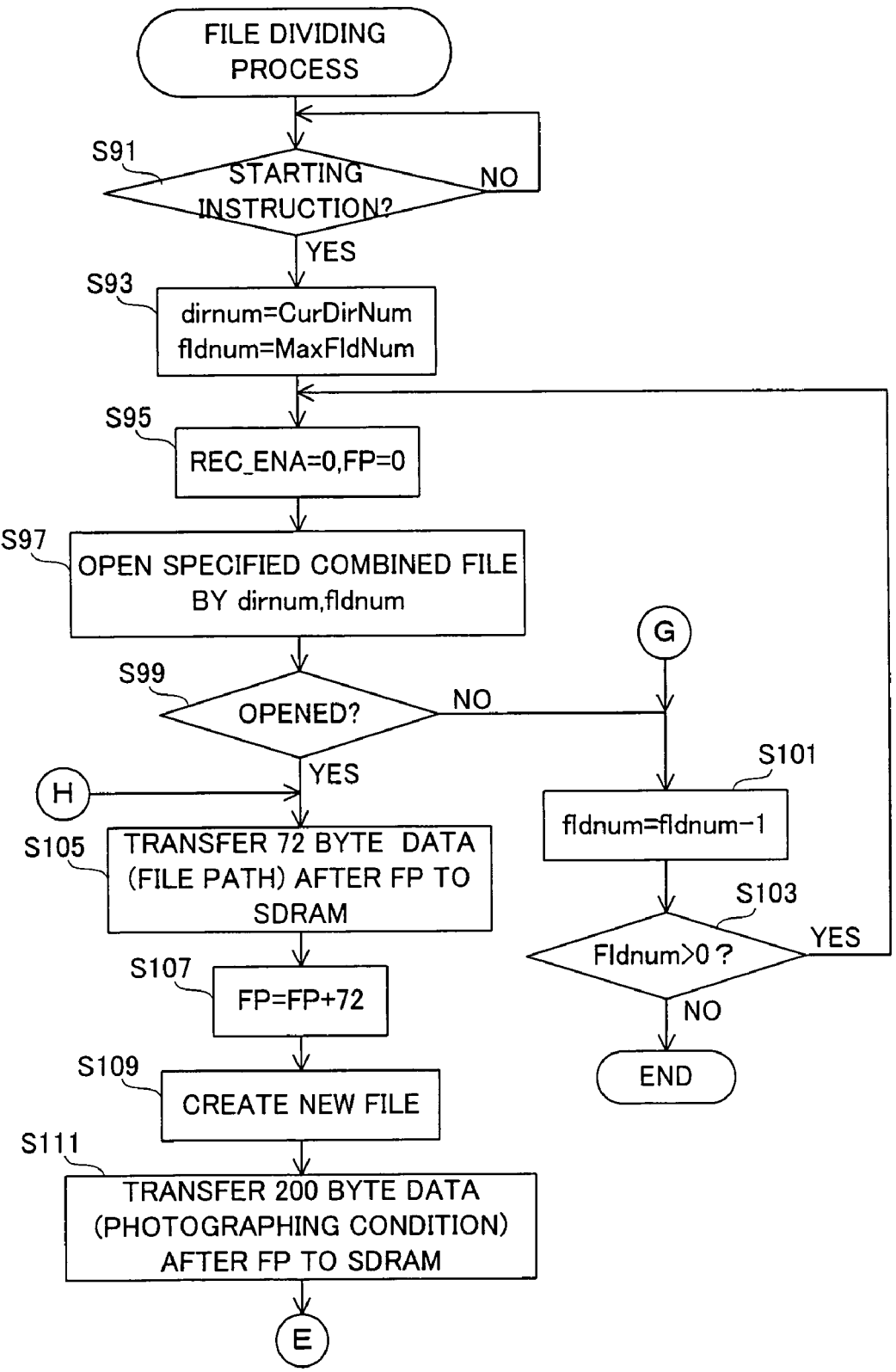
FIG. 11 is a flowchart showing one portion of an operation of a CPU when performing a file dividing process.

Referring to FIG. 11, in the file dividing process, first, it is determined whether or not a starting instruction is applied in the step S91. Herein, if YES, the process advances to the step S93, a directory number CurDirnum of the sub directory currently selected is set as a directory number dirnum, and the maximum folder number MaxFldnum determined in the step S19 in FIG. 7 is set as a folder number fldnum. In the step S95, the flag REC_ENA and a file pointer FP are reset. In the succeeding step S97, in order to open the combined file specified by the directory number dirnum and the folder number fldnum, a file opening request is applied to the disk drive 34.

The successive-photographing process is prohibited as a result of the flag REC_ENA being reset, and the head address of the combined file is pointed as a result of the file pointer FP being reset. In addition, when dirnum is equal to (=) 102, and fldnum is equal to (=) 4, it is requested to open the combined file "SEQT0000.DAT" stored in the successive-shooting folder "SEQT00004" at a lower hierarchy of the sub directory "102SANYO".

In the step S101, it is determined whether or not successful to actually open the combined file. When a NOT READY signal is returned from the disk drive 34, it is assumed that the combined file specified in the step S97 does not exist, and in the step S101, the folder number fldnum is decremented. The updated folder number fldnum is compared to "0" in the step S103. If fldnum is equal to (=) 0, it is assumed that there is no combined file in the sub directory currently selected, and the process is ended. On the other hand, fldnum is larger than (>) 0, it is assumed that it is probable that the combined file exists in the sub directory currently selected, and the process returns to the step S95. Therefore, the steps S95-S103 are repeated until the combined file is found or the folder number fldnum is rendered "0".

If the READY signal is returned from the disk drive 34, it is assumed that the combined file is opened, and the process advances to the step S105. In the step S105, 72 bytes of the data existing after a point destination of the file pointer FP is transferred from the magnetooptical disk 36 to the SDRAM 26. The combined file has the structure shown in FIG. 6 so that the file path information 0 included in the additional data 0 is transferred to the SDRAM 26 in the first process of the step S105. Upon completion of transferring the file path information, the point destination of the file pointer FP is advanced by 72 bytes in the step S107.

In the step S109, a creating request of the new image file based on the file path information read out in the immediately preceding step S105 is applied to the disk drive 34. If the read file path information is "¥¥DCIM¥¥102SANYO¥¥SEQT0004¥¥SEQT0401.JPG", it is requested to create an image file "SEQT0401.JPG". More specifically, it is requested to create the image file "SEQT0401.JPG" at a still lower hierarchy of the successive-shooting folder "SEQT0004" created at a lower hierarchy of the sub directory "102SANYO".

Figure 6:
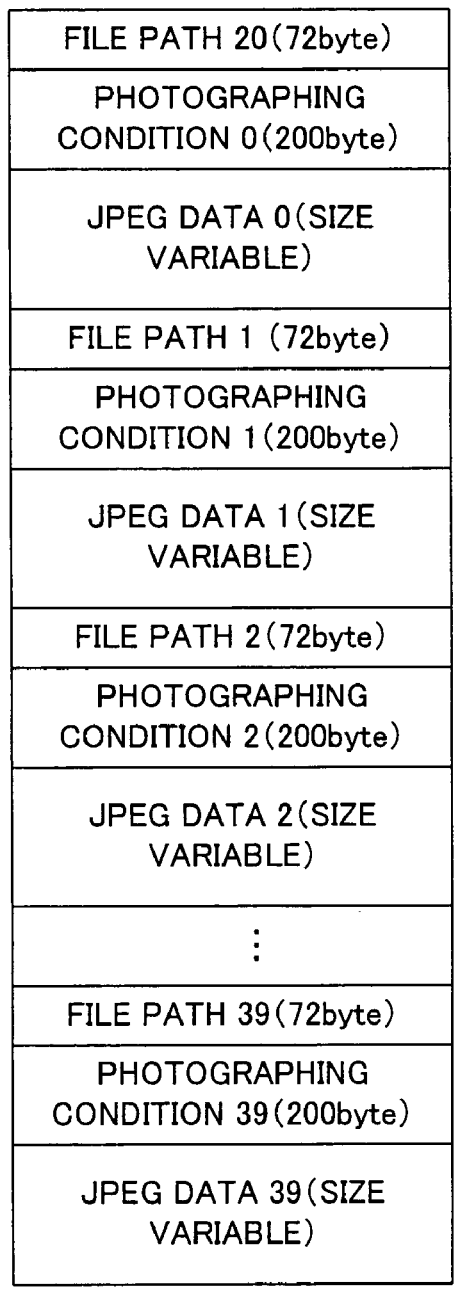
FIG. 6(A) is an illustrative view showing one example of a combined file.
FIG. 6(B) is an illustrative view showing one example of a plurality of divided image files.
Figure 6:
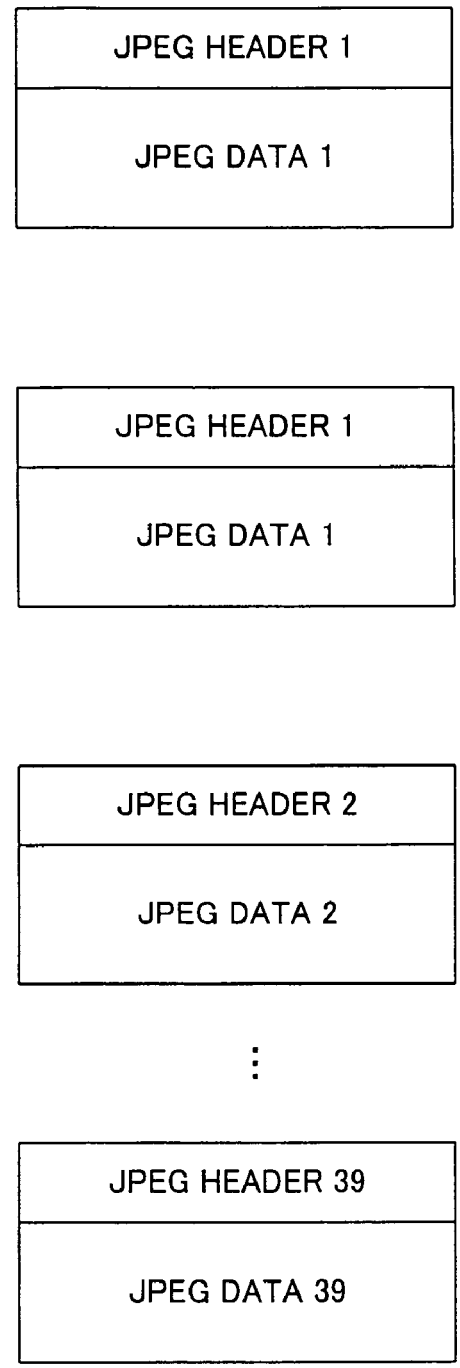

200 bytes of the data existing after the point destination of the file pointer FP is transferred from the magnetooptical disk 36 to the SDRAM 26 in the step S111, and in the succeeding step S113, the point destination of the file pointer FP is advanced by 200 bytes. In the first process of the step S111, the photographing condition information 0 shown in FIG. 6 is transferred to the SDRAM 26. Furthermore, as a result of the first process of the step S113, the file pointer FP points at the head address of the JPEG data 0.

In the step S115, a JPEG data size "PIC_SIZE" is detected from the photographing condition information transferred in the step S111. The detected "PIC_SIZE" indicates the size of the JPEG data existing after the current point destination of the file pointer FP.

Upon completion of the size detection, it is determined whether or not the new image file is created based on the process in the step S109. When the new image file is created, the READY signal is returned from the disk drive 34, and when the new image file is not created, the NOT EADY signal is returned from the disk drive 34. Thereby, in the step S117, it is determined which one of the signals is returned, the READY signal or the NOT READY signal.

If NO is determined in the step S117, the file pointer FP is advanced by "PIC_SIZE" in the step S119, and the process is moved to the step S135. When the successive-photographing operation is performed during the file dividing process toward the combined file to be noticed, and then, the file dividing process toward the combined file to be noticed is resumed, the process of the step S119 is performed.

On the other hand, if YES is determined in the step S117, the disk drive 34 is requested to open the new image file in the step S121, and in the step S123, the data worth "PIC_SIZE" existing after the point destination of the file pointer FP is transferred from the magnetooptical disk 36 to the SDRAM 26. In the first process of the step S123, the JPEG data 0 is transferred to the SDRAM 26. In the step S125, the file pointer FP is advanced by "PIC_SIZE", and in the step S127, the JPEG header including the photographing condition information read out in the immediately preceding step S111 is created. In the step S129, the disk drive 34 is requested to store the created JPEG header into the new image file, and in the step S131, the disk drive 34 is requested to store the JPEG data read out in the immediately preceding step S123 into the new image file. Furthermore, in the step S133, the disk drive 34 is requested to close the new image file.

It is noted that in any step of S121, S129, S131, and S133, the process advances to a subsequent step when the READY signal is returned from the disk drive 34. In addition, in the steps S105, S111, and S123, desired data is read out from the data area 36c based on the FAT information of the combined file written in the FAT area 36a.

In the step S135, the point destination of the file pointer FP is determined. In a case that the point destination exists after an end of the combined file, the disk drive 34 is requested to close the combined file in the step S137, and the disk drive 34 is requested to delete the combined file in the step S139. Upon completion of the process in the step S139, the process returns to the step S101. It is noted that in either step of S137 or S139, the process advances to a subsequent step when the READY signal is returned from the disk drive 34.

If the point destination of the file pointer FP is before the end of the combined file, the process advances from the step S135 to the step S141, and the flag REC_ENE is set in order to permit the successive-photographing process. In the step S143, a state of the flag SUSPEND is determined. Herein, if SUSPEND is equal to (=) 0, it is assumed to be capable of continuing the file dividing process, and the process returns to the step S105 via the reset of the flag REC_ENA in the step S145. On the other hand, if SUSPEND is equal to (=) 1, it is assumed that it is necessary that the file dividing process is suspended, and the disk drive 3 is requested to close the combined file in the step S147. If the READY signal is returned in response to this request, the process is ended.

As understood from the above descriptions, first, the combined file including a plurality of frames of the JPEG data stored in the SDRAM is created in the data area 36c of the magnetooptical disk 36, the FAT information for managing the combined file is created in the FAT area 36a of the magnetooptical disk 36, and the size information of the sub directory to which the combined file belongs is updated in the root directory area 36b. The JPEG data in the combined file is read out by each 1 frame based on the FAT information of the directory entry and the combined file when the successive-photographing operation is not performed.

The read JPEG data of each frame is stored in the image file created in the data area 36c, and upon completion of creating the image file, the FAT information of the image file is written into the FAT area 36a.

The number of frames of the JPEG data included in the combined file (=40) is larger than the number of frames of the JPEG data included in the image file (=1). In other words, the number of the combined files (=1) is smaller than the number of the image files (=40). When writing the FAT information and the size information, it is necessary that the magnetic head 34b and the optical pick up 34c are moved to the FAT area 36a and the root directory area 36b so that a time required for creating the image file takes much longer than the time required for creating the combined file.

That is, a processing time required for creating one combined file in the data area 36c and the FAT information of the combined file in the FAT area 36a, and updating the size information of the sub directory to which the combined file belongs in the root directory area 36b is shorter than the time required for creating 40 image files in the data area 36c, and the FAT information of the image files in the FAT area 36a, and updating the size information of the sub directory to which the image files belong in the root directory area 36b. Thereby, it is possible to rapidly release the SDRAM 26.

In addition, the FAT information of the combined file is written into the FAT area 36a of the magnetooptical disk 36 so that in a case that the recording to or the deleting of the magnetooptical disk 36 is performed by another apparatus, and thereafter, attached to the disk drive 34, it is possible to appropriately create 40 image files. It is noted that if the recording medium is an internal type, the FAT information of the combined file may be written into the internal memory (preferably, non-volatile memory).

Furthermore, the FAT information and the size information are updated at every time that one image file is created so that the suspending/resuming of the image file creating process is made possible. Thereby, it is possible to improve responsive characteristic (flexibility) of the successive-photographing operation.

It is noted that in this embodiment, the FAT system is adopted as a file managing system. However, an UDF (Universal Disc Format) system may be adopted in place thereof. In addition, in this embodiment, 1 frame of the JPEG data is stored in the image file. However, as long as smaller than the number of frames of the JPEG data included in the combined file, the number of frames included in each image file may be plural, and furthermore, the number of frames may not be consistent between the image files.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus, comprising:
    a buffer memory into which M (M≧2, M is integer) images are fetched and stored in response to a fetching instruction;
    a recording medium to record the M images fetched into the buffer memory;
    a first-file creator for creating in a data area of said recording medium a first file including said M images stored in said buffer memory, said first file being created by writing said M images stored in said buffer memory from said buffer memory directly into said first file created in said data area of said recording medium as a form of combined file;
    a first-managing-information creator for creating first managing information that manages said first file;
    a reader for reading out, from said recording medium, N (N<M, N is integer) of the M images from said first file stored in said data area of said recording medium based on said first managing information when a predetermined condition that said fetching instruction is not received is satisfied;
    a second-file creator for creating in said data area a second file including said N images read out by said reader, said second file being created by transferring said N images read out from said first file stored in said recording medium from said first file to said second file as a form of divided file; and
    a second-managing-information creator for creating in a managing area of said recording medium a second-file managing information that manages said second file.

2. An image recording apparatus according to claim 1, wherein
    said recording medium is detachable, and
    said first-file managing information creator creates in said managing area said first file managing information.

3. An image recording apparatus according to claim 1 or 2, wherein
    said second-file managing information creator creates said second-file managing information at every time that said second file is created once, and the apparatus further comprising a determining means for determining whether or not said predetermined condition is satisfied at every time that said second-file managing information is created once.

4. An image recording apparatus according to claim 1 or 2, further comprising:
    a fetcher for fetching said M of images into said buffer memory in response to said fetching instruction.

5. An image recording apparatus according to claim 1 or 2, wherein
    said recording medium is a disk recording medium having said data area and said managing area formed in a radius direction thereof, the apparatus further comprising,
    a movable recording member moving between said data area and said managing area.

6. A digital camera comprising an image recording apparatus according to claim 1 or 2.

7. An image recording apparatus according to claim 1, wherein said M images included in said first file are compressed images, and said N images included in said second file are compressed images.

8. An image recording method for recording M (M≧2, M is integer) images that are fetched into a buffer memory in response to a fetching instruction in a recording medium, comprising:
    creating a first-file in a data area of said recording medium, said first file including said M images stored in said buffer memory, said creating said first file including writing said M images stored in said buffer memory from said buffer memory directly into said first file created in said data area of said recording medium as a form of combined file;
    creating first managing information that manages said first file;
    reading out, from said recording medium, N (N<M, N is integer) of the M images from said first file stored in said data area of said recording medium based on said first managing information when a predetermined condition that said fetching instruction is not received is satisfied;
    creating a second-file in said data area, said second file including said N images read out by said reader, said creating said second file including creating a form of divided file by transferring said N images read out from said first file stored in said recording medium from said first file to said second file; and
    creating second file managing-information that manages said second file in a managing area of said recording medium.

* * * * *